US009790453B2

(12) United States Patent
Batchelor et al.

(10) Patent No.: US 9,790,453 B2
(45) Date of Patent: Oct. 17, 2017

(54) DYE POLYMER

(75) Inventors: Stephen Norman Batchelor, Wirral (GB); Sheng Meng, Shanghai (CN); Qingsheng Tao, Shanghai (CN); Jinfang Wang, Shanghai (CN)

(73) Assignee: Conopco, Inc., Englewood Cliffs, NJ (US)

( * ) Notice: Subject to any disclaimer, the term of this patent is extended or adjusted under 35 U.S.C. 154(b) by 200 days.

(21) Appl. No.: 14/002,131

(22) PCT Filed: Feb. 23, 2012

(86) PCT No.: PCT/EP2012/053061
§ 371 (c)(1),
(2), (4) Date: Aug. 29, 2013

(87) PCT Pub. No.: WO2012/119859
PCT Pub. Date: Sep. 13, 2012

(65) Prior Publication Data
US 2013/0333122 A1    Dec. 19, 2013

(30) Foreign Application Priority Data

Mar. 10, 2011  (WO) ................ PCT/CN2011/071665

(51) Int. Cl.
C09B 69/10 (2006.01)
C11D 3/40 (2006.01)
C11D 3/42 (2006.01)
C11D 3/37 (2006.01)

(52) U.S. Cl.
CPC .............. *C11D 3/42* (2013.01); *C09B 69/101* (2013.01); *C09B 69/106* (2013.01); *C09B 69/109* (2013.01); *C11D 3/3723* (2013.01); *C11D 3/40* (2013.01)

(58) Field of Classification Search
CPC ... C09B 69/101; C09B 69/106; C09B 69/109; C11D 3/40; C11D 3/3723; C11D 3/42
See application file for complete search history.

(56) References Cited

U.S. PATENT DOCUMENTS

| 4,182,612 A * | 1/1980 | Sokol et al. ................ 8/426 |
| 4,206,240 A | 6/1980 | Bunes |
| 4,664,708 A | 5/1987 | Allen |
| 4,962,190 A | 10/1990 | Mayer |
| 2006/0079438 A1 | 4/2006 | Brush |
| 2007/0179075 A1* | 8/2007 | Souter et al. ............... 510/320 |
| 2007/0259800 A1* | 11/2007 | Boutique ................ C11D 3/40 510/276 |
| 2011/0124837 A1* | 5/2011 | Hong ............... C08G 65/33313 528/226 |
| 2003/0333122 | 12/2013 | Batchelor |

FOREIGN PATENT DOCUMENTS

| CN | 103429670 A | 12/2013 |
| EP | 0317859 A2 | 5/1989 |
| EP | 0479726 A1 | 4/1992 |
| GB | 1009911 A | 11/1965 |
| GB | 2440219 A | 1/2008 |
| WO | WO9740108 A1 | 10/1997 |
| WO | WO2006055787 A1 | 5/2006 |
| WO | WO2008009579 A1 | 1/2008 |
| WO | WO2009090125 A1 | 7/2009 |

OTHER PUBLICATIONS

PCT International Search Report in PCT application PCT/EP2012/053061 dated Jun. 25, 2012 with Written Opinion.
PCT International Search Report in PCT application PCT/CN2011/071665 dated Dec. 22, 2011 with Written Opinion.
Search Report in CN2012800123890 (Translation).

* cited by examiner

*Primary Examiner* — Amina Khan
(74) *Attorney, Agent, or Firm* — Greenberg Traurig, LLP

(57) ABSTRACT

The present invention relates to polymeric shading dye and their use in laundry applications. The polymers are alkoxylated polyethylene imines and the dyes are reactive dyes.

9 Claims, No Drawings

DYE POLYMER

FIELD OF INVENTION

The present invention relates to polymeric shading dye and their use.

BACKGROUND OF THE INVENTION

WO2006/055787 (Procter & Gamble) discloses laundry formulations containing a cellulose ether polymer covalently bound to a reactive dye for whitening fabric. Such polymers provide poor performance on polyester fabrics.

SUMMARY OF THE INVENTION

The dye polymers of the present invention are substantive over a wide range of differing fabrics.

In one aspect the present invention provides a dye polymer, the dye polymer comprising a core polyamine of which from 60 to 100 mol %, preferably 75 to 98 mol %, of the primary and secondary amines of the core polyamine are alkoxylated and from 0.1 to 30 mol %, preferably 1 to 20 mol %, of the primary and secondary amines of the core polyamine are covalently bound to a reactive dye.

In another aspect the present invention provides a laundry treatment composition comprising:
  (i) from 2 to 70 wt % of a surfactant; and,
  (ii) from 0.0001 to 20.0 wt % of a dye polymer,
wherein the dye polymer is a polylalkoxylkated polyamine in which from 60 to 100 mol %, preferably 75 to 98 mol %, of the primary and secondary amines of the of the core polyamine are alkoxylated and from 0.1 to 30 mol %, preferably 1 to 20 mol %, of the primary and secondary amines are covalently bonded to a reactive dye.

In further aspect the present invention provides a laundry treatment composition comprising:
  (i) from 2 to 70 wt % of a surfactant; and,
  (ii) from 0.0001 to 20.0 wt % of a dye polymer,
wherein the dye polymer is a polylalkoxylkated polyamine in which from 60 to 100 mol %, preferably 75 to 98 mol %, of the primary and secondary amines of the of the core polyamine are alkoxylated and from 0.1 to 30 mol %, preferably 1 to 20 mol %, of the primary and secondary amines are covalently bonded to a reactive dye.

In an even further aspect the present invention provides a domestic method of treating a textile, the method comprising the steps of:
  (i) treating a textile with an aqueous solution of the dye polymer as, the aqueous solution comprising from 10 ppb to 5000 ppm, of the dye polymer; and, from 0.0 g/L to 3 g/L of a surfactant; and,
  (ii) optionally rinsing and drying the textile.

DETAILED DESCRIPTION

The Dye Polymer

The dye polymer may be any colour.

The dye polymer is preferably blue or violet in colour. In this regard, a blue or violet colour is provided to the cloth to give a hue angle of 230 to 345, more preferably 265 to 330, most preferably 270 to 300. The cloth used is white bleached non-mercerised woven cotton sheeting.

The dye polymer may be formed by reacting a reactive dye with a polylalkoxylkated polyamine. The reaction is preferably conducted in an aqueous solution. The reactive dye is tethered to the polylalkoxykated polyamine by a covalent bond.

Preferably, the dye polymer is other than an organopolysiloxane with a dye residue. Preferably, the dye polymer is devoid of siloxane groups.

The dye polymer is selected from: polyethyleneimine; polypropyleneimine; and, polyvinylamine, preferably, a polyethylene imine.

The alkoxylated groups of the polylalkoxykated polyamine are preferably selected from: ethoxy; and propoxy. The alkoxylated groups are preferably polyalkylene oxide chains having repeat units of alkoxy moieties in the range from 5 to 30. The reactive dye is selected from: reactive blue; reactive black; reactive red; and, reactive violet dyes. Preferably the reactive dyes are selected from mixtures of: reactive black and reactive red; reactive blue and reactive red; reactive black and reactive violet; and, reactive blue and reactive violet, wherein the number of blue or black dye moieties is in excess of the red or violet dye moieties. Preferably, the reactive dye is negatively charged and is selected from a chromophore selected from the group comprising of: azo; anthraquinone; phthalocyanine; and, triphendioxazine. The reactive dye used for preparation had reactive group selected from the group comprising: dichlorotriazinyl; difluorochloropyrimidine; monofluorotrazinyl; dichloroquinoxaline; vinylsulfone; difluorotriazine; monochlorotriazinyl; bromoacrlyamide; and, trichloropyrimidine.

Preferably the weight average molecular weight of the dye polymer is from 2000 to 200000, preferably from 7000 to 70000.

It will be appreciated that the dye polymer is obtainable by reacting:
a reactive dye with a polylalkoxykated polyamine in which from 60 to 100 mol %, preferably 75 to 98 mol %, of the primary and secondary amines of the core polyamine are alkoxylated. This also forms another aspect of the invention.

The core polyamine for the reaction is preferably selected from: polyethyleneimine; polypropyleneimine; and, polyvinylamine, most preferably polyethylene imine. Preferably, the alkoxylated groups of the polylalkoxykated polyamine are selected from: ethoxy; and propoxy, most preferably the alkoxylated groups are polyalkylene oxide chains having repeat units of alkoxy moieties in the range from 5 to 30.

In the reaction the reactive dye is preferably selected from: reactive blue; reactive black; reactive red; and, reactive violet dyes. Preferably, the reactive dyes are selected from mixtures of: reactive black and reactive red; reactive blue and reactive red; reactive black and reactive violet; and, reactive blue and reactive violet, wherein the number of blue or black dye moieties is in excess of the red or violet dye moieties. Preferably, the reactive dye is negatively charged and is selected from a chromophore selected from the group comprising of: azo; anthraquinone; phthalocyanine; and, triphendioxazine. Preferably, the reactive dye has reactive group selected from the group comprising: dichlorotriazinyl; difluorochloropyrimidine; monofluorotrazinyl; dichloroquinoxaline; vinylsulfone; difluorotriazine; monochlorotriazinyl; bromoacrlyamide; and, trichloropyrimidine.

When core polyamine is referred to as being covalently bound to a reactive dye one skilled in the art will understand that the reactive group is no longer present in the dye polymer. This is exemplified below for three reactive groups:

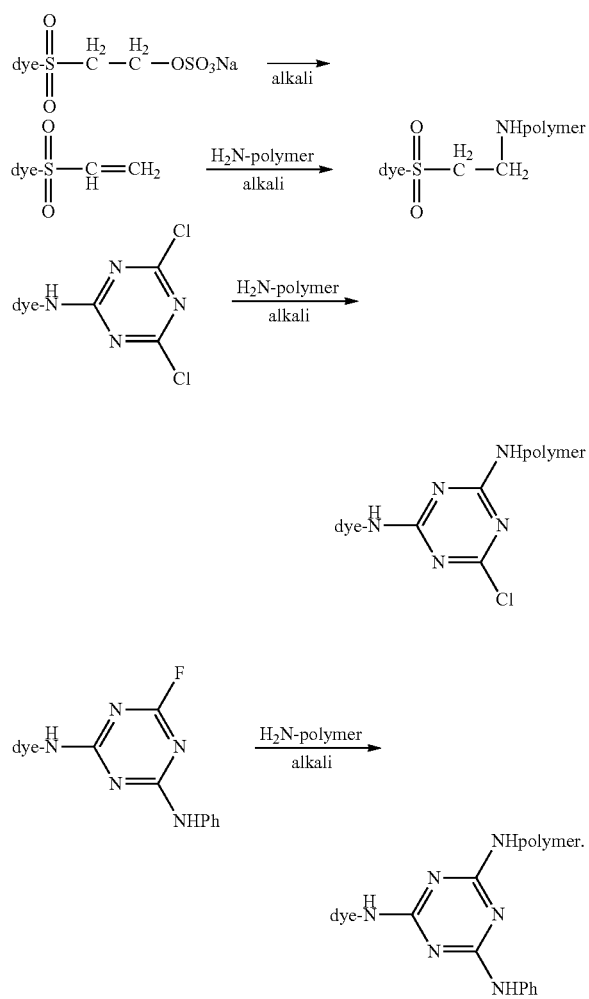

Polyalkoxylated Polyamines

A polylalkoxylkated polyamine is an organic compound that comprises alkoxylated amines and has at least one primary or secondary amine. The primary or secondary amine present is to permit the formation of a covalent bond with a reactive dye.

Polyalkoxylated polyamines may be formed by different processes.

Preferred polyalkoxylated polyamines are: polyethyleneimine, polypropyleneimine and polyvinylamine that are polyalkoxylated, preferably polyethoxylated or polypropoxylated.

Most preferably the polyalkoxylated polyamines is a polyalkoxylated polyethylene imine.

EPEI Polymers

Polyethyleneimine (PEI) are formed by ring opening polymerisation of ethyleneimine, the PEI's are then alkoxylated. In this regard, a single or a number of amine functions are reacted with one or more alkylene oxide groups to form a polyalkylene oxide side chain. The alkylene oxide can be a homopolymer (for example ethylene oxide) or a random or block copolymer.

PEI's are usually highly branched polyamines characterized by the empirical formula (C2H5N)n with a molecular mass of 43.07 (as repeating units). They are commercially prepared by acid-catalyzed ring opening of ethyleneimine, also known as aziridine. (The latter, ethyleneimine, is prepared through the sulphuric acid esterification of ethanolamine).

As discussed above, the core polyamine forms a polylalkoxylkated polyamine. The alkoxy groups are preferably selected from ethoxy and propoxy groups and preferably are polyalkylene oxide chains having repeat units of alkoxy moieties in the range from 5 to 30, preferably 12 to 22.

The polyalkylimine core, preferably PEI, of the polymer preferably has a weight average molecular weight of 200-60000, more preferably 400-2000, most preferably 500-1000. The polyalkylimine core may be branched or linear, preferably branched.

The molecular weights are determined by dynamic light scattering using a Zetasizer Nano (Malvern).

EPEI's are commercially available from the BASF Corporation and from Nippon Shokubai.

Suitable EPEIs for reacting with reactive dyes are found in: WO2007/083262; WO 2006/113314; EP760846; U.S. Pat. No. 4,597,898; WO 2009/060409; WO 2008/114171; WO 2008/007320; EP 760846; WO 2009/065738; WO 2009/060409; WO 2005/063957; EP 996701; EP 918837; EP 917562; EP 907703; and, U.S. Pat. No. 6,156,720.

An example PEI core is shown below:

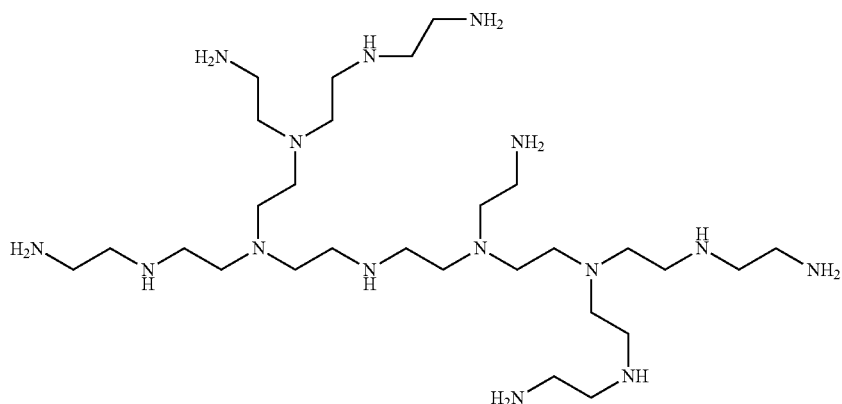

The polymer contains 15 Nitrogens of which 6 are primary amines (NH$_2$); 5 are secondary amines (NH) and 4 are tertiary amines. After ethoxylation and dyeing the dye-polymer is of the following structure:

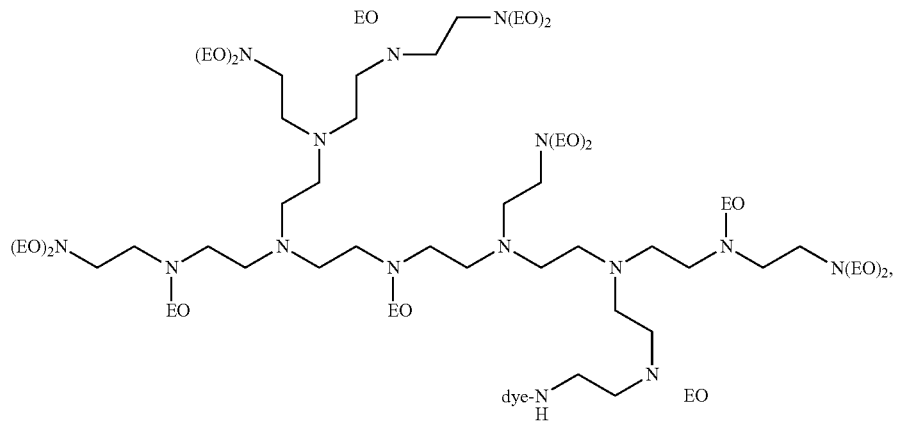

in which EO represents an ethoxylate.

In the dye-polymer 10 of the primary and secondary amines of the core PEI now carry an ethoxy group, which is 10/11*100=90.90 mol % (2 decimal places). One of the primary and secondary amines is now bound to a dye, which is 1/11*100=9.09 mol % (2 decimal places).

Further examples are:

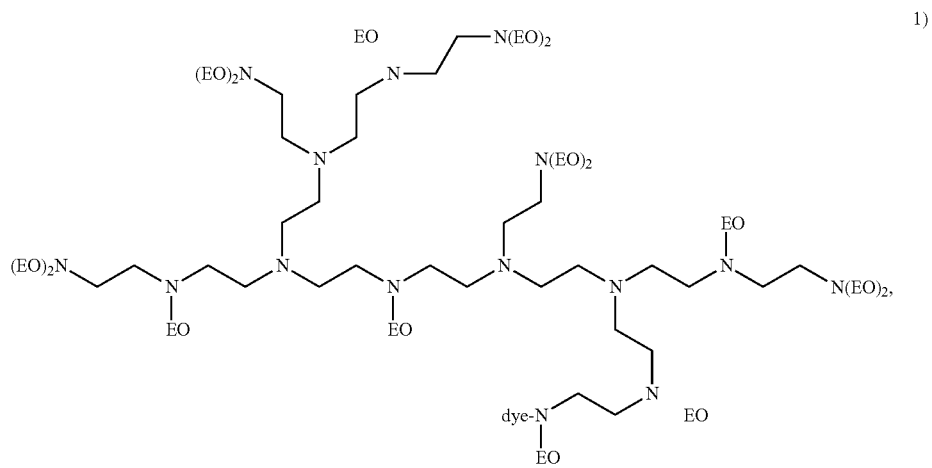

1)

In which 11 out of 11 of the primary and secondary amines of the core PEI are ethoxylated, which is 100 mol %, 1 out of 11 of the primary and secondary amines of the core PEI are bound to a dye which is 9.09 mol % (2 decimal places).

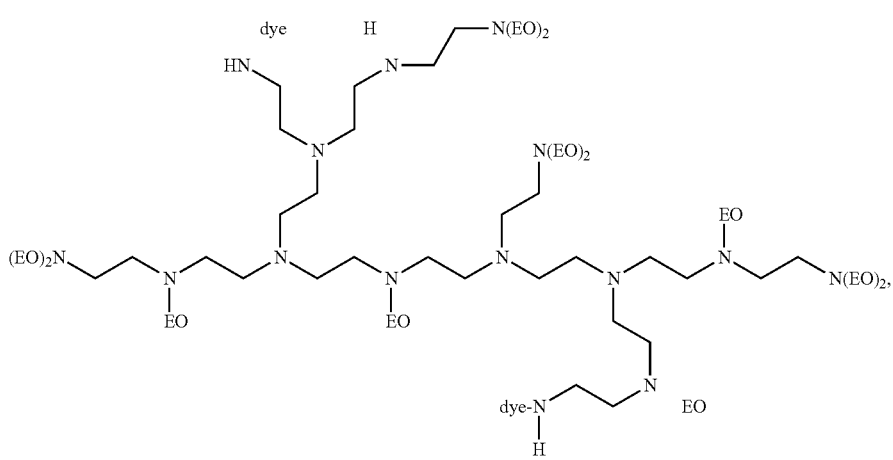

In which 8 out of 11 of the primary and secondary amines of the core PEI are ethoxylated, which is 72.73 mol % (2 decimal places), 2 out of 11 of the primary and secondary amines of the core PEI are bound to a dye which is 18.18 mol % (2 decimal places).

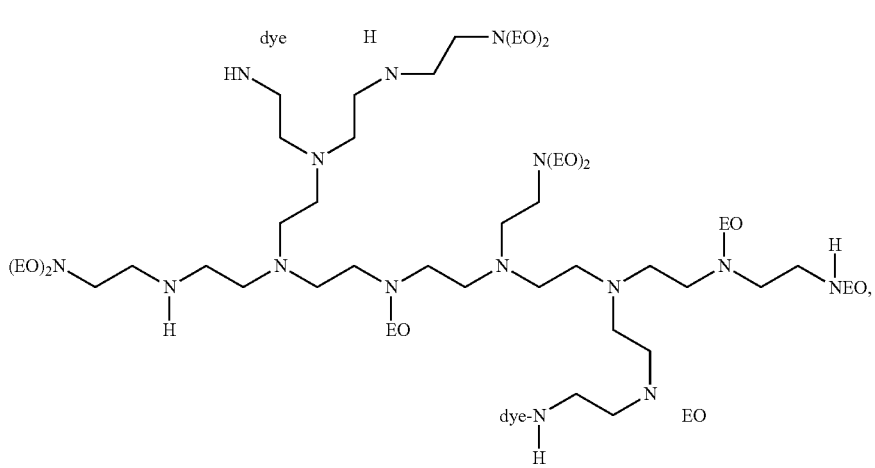

in which 7 out of 11 of the primary and secondary amines of the core PEI are ethoxylated, which is 63.63 mol % (2 decimal places), 2 out of 11 of the primary and secondary amines of the core PEI are bound to a dye which is 18.18 mol % (2 decimal places).

The structure and ratios of groups can be determined by NMR measurements.

Dye-polymers of the current invention prevent re-deposition of soil in the wash and aid removal of soil.

Reactive Dyes

Reactive dyes are described in Industrial Dyes (K. Hunger ed, Wiley VCH 2003). Many Reactive dyes are listed in the colour index (Society of Dyers and Colourists and American Association of Textile Chemists and Colorists).

Reactive dyes consist of a dye chromophore covalently bound to a reactive group. Reactive groups react with primary and secondary amines to form a covalent bound, preferably by a substitution or addition reaction.

Blue and violet dye chromophores are preferably selected from anthraquinone, bis-azo, triphenodioxazine, and phthalocyanine, more preferably anthraquinone, bis-azo, and triphenodioxazine, most preferably bis-azo and triphenodioxazine.

Red and violet reactive dyes may be mixed with the blue and violet reactive dyes to provide the correct hue. Reactive red dye chromophores are preferably selected from mono and bis-azo dyes.

A preferred blue bis-azo dye is of the form

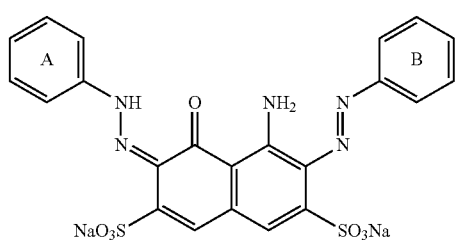

Where one or both of the A and B rings are substituted by a reactive group.

The A and B rings may be further substituted by sulphonate groups (SO$_3$Na).

The A and B rings may be further substituted with suitable uncharged organic groups, preferably with a molecular weight lower than 200. Preferred groups are —CH$_3$, —C$_2$H$_5$, and —OCH$_3$ A preferred blue anthraquinone dye is of the form:

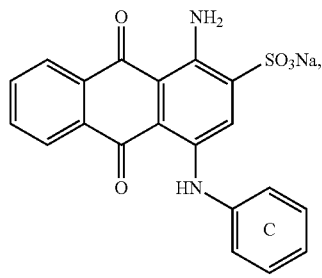

where the C ring is substituted by a reactive group. The dye may be further substituted with sulphonate groups (SO$_3$Na) and suitable uncharged organic groups, preferably with a molecular weight lower than 200. Preferred uncharged organic groups are —CH$_3$, —O$_2$H$_5$, and —OCH$_3$.

A preferred triphenodioxazine dye is of the form

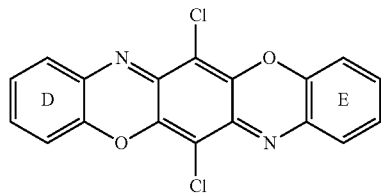

Where the D and E rings are substituted by a reactive groups. Preferably the D and E rings are further substituted by sulphonate groups (SO$_3$Na).

A preferred red azo dye is of the form

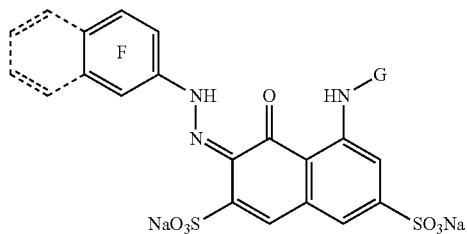

Where the F ring is optionally extended to form a naphthyl group are optionally substituted groups selected from sulphonate groups (SO$_3$Na) and a reactive group.

G is selected from a reactive group, H, or alky group. A reactive group must be present on the dye.

With the exception of copper phthalocyanine dyes, metal complex dyes are not preferred.

Reactive groups are preferably selected from heterocyclic reactive groups and, a sulfooxyethylsulfonyl reactive group (—SO$_2$CH$_2$CH$_2$OSO$_3$Na).

The heterocyclic reactive groups are preferably nitrogen contains aromatic rings bound to a halogen or an ammonium group, which react with NH$_2$ or NH groups of the polymers to form a covalent bond. The halogen is preferred. More preferred heterocylic reactive groups are dichlorotriazinyl, difluorochloropyrimidine, monofluorotrazinyl, monofluorochlorotrazinyl, dichloroquinoxaline, difluorotriazine, monochlorotriazinyl, and trichloropyrimidine.

The reactive group may be linked to the dye chromophore via an alkyl spacer for example: dye-NH—CH$_2$CH$_2$-reactive group.

Especially preferred heterocylic reactive groups are:

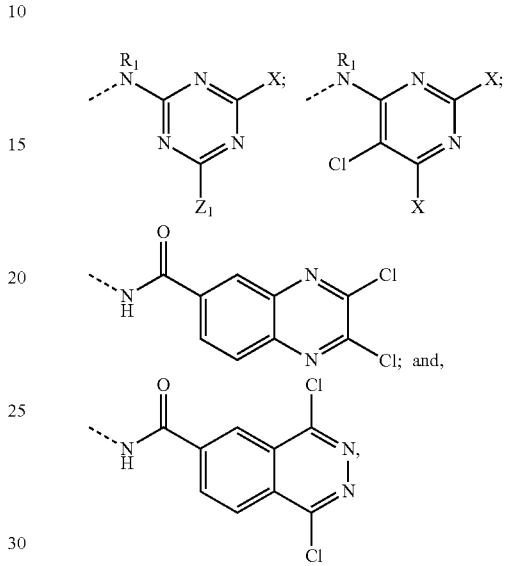

wherein R$_1$ is selected from H or alkyl, preferably H.

X is selected from F or Cl.

When X=Cl, Z$_1$ is selected from —Cl, —NR$_2$R$_3$, —OR$_2$, —SO$_3$Na

When X=F, Z$_1$ is selected from —NR$_2$R$_3$

R$_2$ and R$_3$ are independently selected from H, alkyl and aryl groups. Aryl groups are preferably phenyl and are preferably substituted by —SO$_3$Na or —SO$_2$CH$_2$CH$_2$OSO$_3$Na. Alkyl groups are preferably methyl or ethyl.

The phenyl groups may be further substituted with suitable uncharged organic groups, preferably with a molecular weight lower than 200. Preferred groups include —CH$_3$, —C$_2$H$_5$, and —OCH$_3$.

The alkyl groups may be further substituted with suitable uncharged organic groups, preferably with a molecular weight lower than 200. Preferred groups include —CH$_3$, —C$_2$H$_5$, —OH, —OCH$_3$, —OC$_2$H$_4$OH.

Most preferred heterocylic reactive groups are selected from

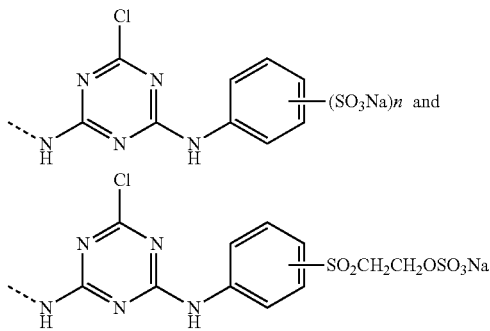

Where n=1 or 2, preferably 1.

Preferably the reactive dye contains more than one reactive group, preferably two or three.

An untethered hydrolysed reactive dyes is one in which the reactive groups have reacted with the hydroxide anion, HO⁻, rather than the polymer. Preferably the composition contains less than 100 ppm of untethered hydrolysed reactive dye per 10000 ppm dye-polymer, more preferably less than 20 ppm. Most preferably untethered hydrolysed reactive dyes are not present in the composition. Such dyes may be removed by dialysis or careful control of the reaction conditions.

Where a reactive dye has been tethered to the polymer to form one or more covalent bonds and has a hydrolysed reactive group this is not classed as an unteathered reactive dye.

Preferably the dye-polymers of the invention as received from the synthetic procedure have less than 1000 ppm of material with weight average molecular weight lower than 1500, more preferably less than 5 ppm, when 10 000 ppm of dye polymer is present in aqueous solution. Low molecular weight material may be removed by dialysis or avoided by careful control of the reaction conditions.

Examples of reactive dyes are reactive blue 2, reactive blue 4, reactive blue 5, reactive blue 7, reactive blue 15, reactive blue 19, reactive blue 27, reactive blue 29, reactive blue 49, reactive blue 50, reactive blue 74, reactive blue 94, reactive blue 246, reactive blue 247, reactive blue 247, reactive blue 166, reactive blue 109, reactive blue 187, reactive blue 213, reactive blue 225, reactive blue 238, reactive blue 256. Further structures are exemplified below:

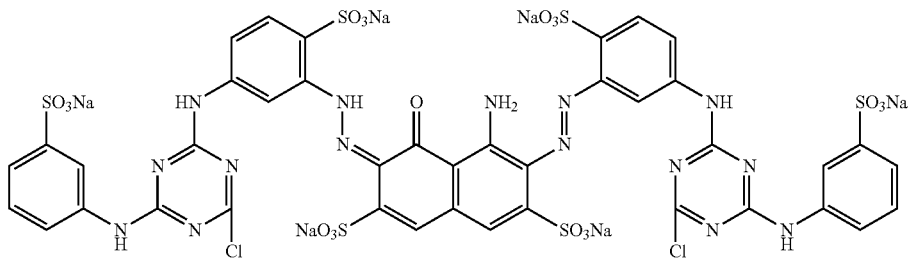

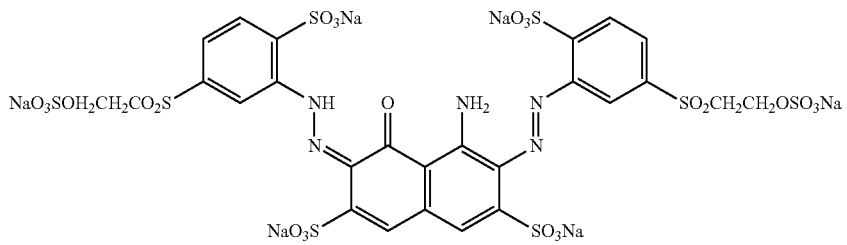

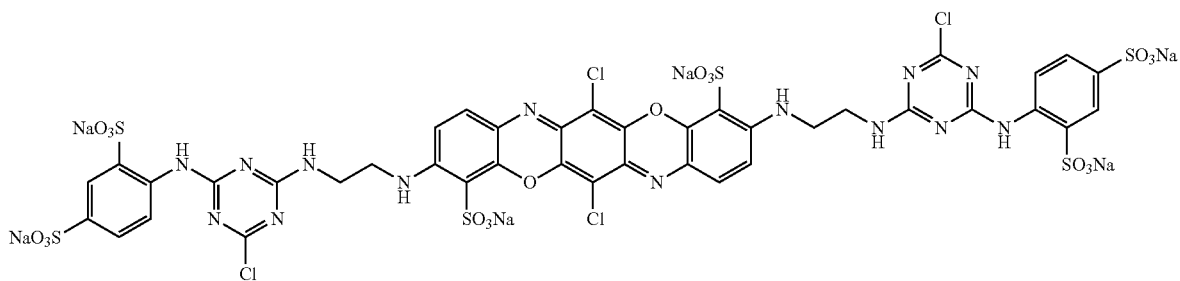

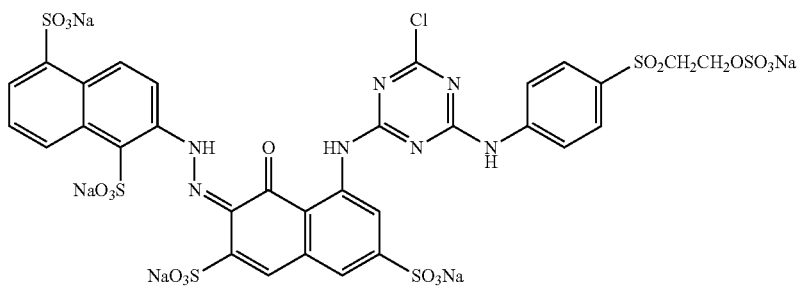

-continued

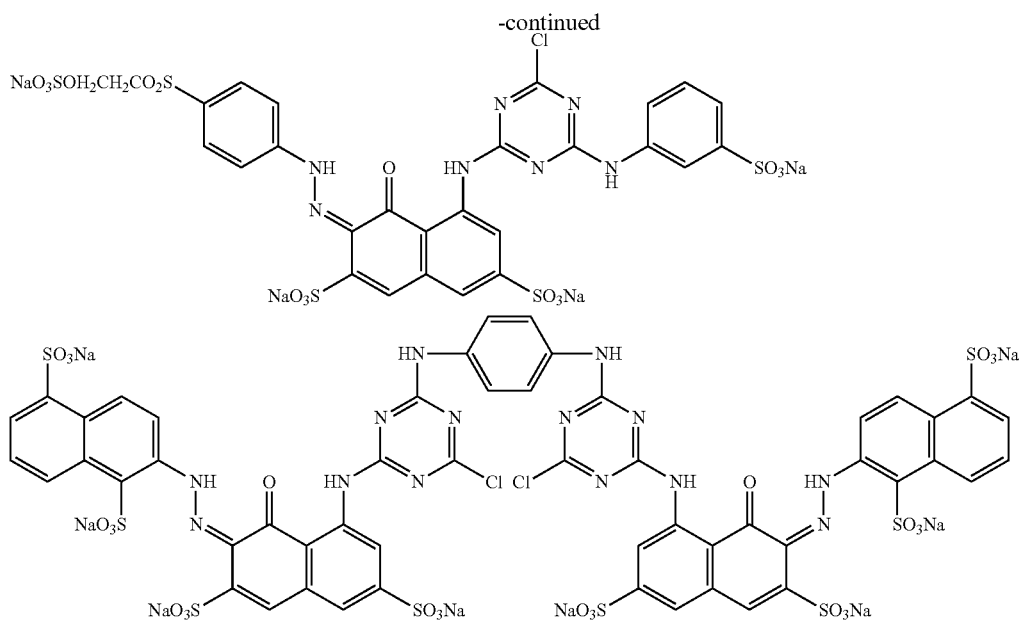

Surfactant

The composition comprises between 2 to 70 wt % of a surfactant, most preferably 10 to 30 wt %. In general, the nonionic and anionic surfactants of the surfactant system may be chosen from the surfactants described "Surface Active Agents" Vol. 1, by Schwartz & Perry, Interscience 1949, Vol. 2 by Schwartz, Perry & Berch, Interscience 1958, in the current edition of "McCutcheon's Emulsifiers and Detergents" published by Manufacturing Confectioners Company or in "Tenside-Taschenbuch", H. Stache, 2nd Edn., Carl Hauser Verlag, 1981. Preferably the surfactants used are saturated.

Suitable nonionic detergent compounds which may be used include, in particular, the reaction products of compounds having a hydrophobic group and a reactive hydrogen atom, for example, aliphatic alcohols, acids, amides or alkyl phenols with alkylene oxides, especially ethylene oxide either alone or with propylene oxide. Specific nonionic detergent compounds are $C_6$ to $C_{22}$ alkyl phenol-ethylene oxide condensates, generally 5 to 25 EO, i.e. 5 to 25 units of ethylene oxide per molecule, and the condensation products of aliphatic $C_8$ to $C_{18}$ primary or secondary linear or branched alcohols with ethylene oxide, generally 5 to 40 EO.

Suitable anionic detergent compounds which may be used are usually water-soluble alkali metal salts of organic sulphates and sulphonates having alkyl radicals containing from about 8 to about 22 carbon atoms, the term alkyl being used to include the alkyl portion of higher acyl radicals. Examples of suitable synthetic anionic detergent compounds are sodium and potassium alkyl sulphates, especially those obtained by sulphating higher $C_8$ to $C_{18}$ alcohols, produced for example from tallow or coconut oil, sodium and potassium alkyl $C_9$ to $C_{20}$ benzene sulphonates, particularly sodium linear secondary alkyl $C_{10}$ to $C_{15}$ benzene sulphonates; and sodium alkyl glyceryl ether sulphates, especially those ethers of the higher alcohols derived from tallow or coconut oil and synthetic alcohols derived from petroleum. The preferred anionic detergent compounds are sodium $C_{11}$ to $C_{15}$ alkyl benzene sulphonates and sodium $C_{12}$ to $C_{18}$ alkyl sulphates. Also applicable are surfactants such as those described in EP-A-328 177 (Unilever), which show resistance to salting-out, the alkyl polyglycoside surfactants described in EP-A-070 074, and alkyl monoglycosides.

Preferred surfactant systems are mixtures of anionic with nonionic detergent active materials, in particular the groups and examples of anionic and nonionic surfactants pointed out in EP-A-346 995 (Unilever). Especially preferred is surfactant system that is a mixture of an alkali metal salt of a $C_{16}$ to $C_{18}$ primary alcohol sulphate together with a $C_{12}$ to $C_{15}$ primary alcohol 3 to 7 EO ethoxylate.

The nonionic detergent is preferably present in amounts greater than 10%, e.g. 25 to 90 wt % of the surfactant system. Anionic surfactants can be present for example in amounts in the range from about 5% to about 40 wt % of the surfactant system.

In another aspect which is also preferred the surfactant may be a cationic such that the formulation is a fabric conditioner.

To facilitate ease of use the formulation is preferably packed in pack sizes of 0.5 to 5 kg. To reduce moisture ingress, the formulation is preferably packs in laminated cardboard packs or sealed plastic bags.

Cationic Compound

When the present invention is used as a fabric conditioner it needs to contain a cationic compound.

Most preferred are quaternary ammonium compounds.

It is advantageous if the quaternary ammonium compound is a quaternary ammonium compound having at least one $C_{12}$ to $C_{22}$ alkyl chain.

It is preferred if the quaternary ammonium compound has the following formula:

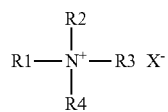

in which $R^1$ is a $C_{12}$ to $C_{22}$ alkyl or alkenyl chain; $R^2$, $R^3$ and $R^4$ are independently selected from $C_1$ to $C_4$ alkyl chains and $X^-$ is a compatible anion. A preferred compound of this type is the quaternary ammonium compound cetyl trimethyl quaternary ammonium bromide.

A second class of materials for use with the present invention are the quaternary ammonium of the above structure in which $R^1$ and $R^2$ are independently selected from $C_{12}$ to $C_{22}$ alkyl or alkenyl chain; $R^3$ and $R^4$ are independently selected from $C_1$ to $C_4$ alkyl chains and $X^-$ is a compatible anion.

A detergent composition according to claim 1 in which the ratio of (ii) cationic material to (iv) anionic surfactant is at least 2:1.

Other suitable quaternary ammonium compounds are disclosed in EP 0 239 910 (Proctor and Gamble).

It is preferred if the ratio of cationic to nonionic surfactant is from 1:100 to 50:50, more preferably 1:50 to 20:50.

The cationic compound may be present from 1.5 wt % to 50 wt % of the total weight of the composition. Preferably the cationic compound may be present from 2 wt % to 25 wt %, a more preferred composition range is from 5 wt % to 20 wt %.

The softening material is preferably present in an amount of from 2 to 60% by weight of the total composition, more preferably from 2 to 40%, most preferably from 3 to 30% by weight.

The composition optionally comprises a silicone.

Builders or Complexing Agents:

Builder materials may be selected from 1) calcium sequestrant materials, 2) precipitating materials, 3) calcium ion-exchange materials and 4) mixtures thereof.

Examples of calcium sequestrant builder materials include alkali metal polyphosphates, such as sodium tripolyphosphate and organic sequestrants, such as ethylene diamine tetra-acetic acid.

Examples of precipitating builder materials include sodium orthophosphate and sodium carbonate.

Examples of calcium ion-exchange builder materials include the various types of water-insoluble crystalline or amorphous aluminosilicates, of which zeolites are the best known representatives, e.g. zeolite A, zeolite B (also known as zeolite P), zeolite C, zeolite X, zeolite Y and also the zeolite P-type as described in EP-A-0,384,070.

The composition may also contain 0-65% of a builder or complexing agent such as ethylenediaminetetraacetic acid, diethylenetriamine-pentaacetic acid, alkyl- or alkenylsuccinic acid, nitrilotriacetic acid or the other builders mentioned below. Many builders are also bleach-stabilising agents by virtue of their ability to complex metal ions.

Zeolite and carbonate (carbonate (including bicarbonate and sesquicarbonate) are preferred builders.

The composition may contain as builder a crystalline aluminosilicate, preferably an alkali metal aluminosilicate, more preferably a sodium aluminosilicate. This is typically present at a level of less than 15% w. Aluminosilicates are materials having the general formula:

$$0.8\text{-}1.5M_2O.Al_2O_3.0.8\text{-}6SiO_2$$

where M is a monovalent cation, preferably sodium. These materials contain some bound water and are required to have a calcium ion exchange capacity of at least 50 mg CaO/g. The preferred sodium aluminosilicates contain 1.5-3.5 $SiO_2$ units in the formula above. They can be prepared readily by reaction between sodium silicate and sodium aluminate, as amply described in the literature. The ratio of surfactants to alumuminosilicate (where present) is preferably greater than 5:2, more preferably greater than 3:1.

Alternatively, or additionally to the aluminosilicate builders, phosphate builders may be used. In this art the term 'phosphate' embraces diphosphate, triphosphate, and phosphonate species. Other forms of builder include silicates, such as soluble silicates, metasilicates, layered silicates (e.g. SKS-6 from Hoechst).

Preferably the laundry detergent formulation is a non-phosphate built laundry detergent formulation, i.e., contains less than 1 wt % of phosphate. Preferably the laundry detergent formulation is carbonate built.

Fluorescent Agent

The composition preferably comprises a fluorescent agent (optical brightener). Fluorescent agents are well known and many such fluorescent agents are available commercially. Usually, these fluorescent agents are supplied and used in the form of their alkali metal salts, for example, the sodium salts. The total amount of the fluorescent agent or agents used in the composition is generally from 0.005 to 2 wt %, more preferably 0.01 to 0.1 wt %. Preferred classes of fluorescer are: Di-styryl biphenyl compounds, e.g. Tinopal (Trade Mark) CBS-X, Di-amine stilbene di-sulphonic acid compounds, e.g. Tinopal DMS pure Xtra and Blankophor (Trade Mark) HRH, and Pyrazoline compounds, e.g. Blankophor SN. Preferred fluorescers are: sodium 2 (4-styryl-3-sulfophenyl)-2H-napthol[1,2-d]triazole, disodium 4,4'-bis{[(4-anilino-6-(N methyl-N-2 hydroxyethyl) amino 1,3,5-triazin-2-yl)]amino}stilbene-2-2' disulfonate, disodium 4,4'-bis{[(4-anilino-6-morpholino-1,3,5-triazin-2-yl)]amino}stilbene-2-2' disulfonate, and disodium 4,4'-bis (2-sulfostyryl)biphenyl.

It is preferred that the aqueous solution used in the method has a fluorescer present. When a fluorescer is present in the aqueous solution used in the method it is preferably in the range from 0.0001 g/l to 0.1 g/l, preferably 0.001 to 0.02 g/l.

Perfume

Preferably the composition comprises a perfume. The perfume is preferably in the range from 0.001 to 3 wt %, most preferably 0.1 to 1 wt %. Many suitable examples of perfumes are provided in the CTFA (Cosmetic, Toiletry and Fragrance Association) 1992 International Buyers Guide, published by CFTA Publications and OPD 1993 Chemicals Buyers Directory 80th Annual Edition, published by Schnell Publishing Co.

It is commonplace for a plurality of perfume components to be present in a formulation. In the compositions of the present invention it is envisaged that there will be four or more, preferably five or more, more preferably six or more or even seven or more different perfume components.

In perfume mixtures preferably 15 to 25 wt % are top notes. Top notes are defined by Poucher (Journal of the Society of Cosmetic Chemists 6(2):80 [1955]). Preferred top-notes are selected from citrus oils, linalool, linalyl acetate, lavender, dihydromyrcenol, rose oxide and cis-3-hexanol.

Perfume and top note may be used to cue the whiteness benefit of the invention.

It is preferred that the laundry treatment composition does not contain a peroxygen bleach, e.g., sodium percarbonate, sodium perborate, and peracid.

Polymers

The composition may comprise one or more other polymers. Examples are carboxymethylcellulose, poly (ethylene glycol), poly(vinyl alcohol), polycarboxylates such as polyacrylates, maleic/acrylic acid copolymers and lauryl methacrylate/acrylic acid copolymers.

Polymers present to prevent dye deposition, for example poly(vinylpyrrolidone), poly(vinylpyridine-N-oxide), and poly(vinylimidazole), are preferably absent from the formulation.

Enzymes

One or more enzymes are preferred present in a composition of the invention and when practicing a method of the invention.

Preferrably the level of each enzyme is from 0.0001 wt % to 0.1 wt % protein.

Especially contemplated enzymes include proteases, alpha-amylases, cellulases, lipases, peroxidases/oxidases, pectate lyases, and mannanases, or mixtures thereof.

Suitable lipases include those of bacterial or fungal origin. Chemically modified or protein engineered mutants are included. Examples of useful lipases include lipases from *Humicola* (synonym *Thermomyces*), e.g. from *H. lanuginosa* (*T. lanuginosus*) as described in EP 258 068 and EP 305 216 or from *H. insolens* as described in WO 96/13580, a *Pseudomonas* lipase, e.g. from *P. alcaligenes* or *P. pseudoalcaligenes* (EP 218 272), *P. cepacia* (EP 331 376), *P. stutzeri* (GB 1,372,034), *P. fluorescens*, *Pseudomonas* sp. strain SD 705 (WO 95/06720 and WO 96/27002), *P. wisconsinensis* (WO 96/12012), a *Bacillus* lipase, e.g. from *B. subtilis* (Dartois et al. (1993), Biochemica et Biophysica Acta, 1131, 253-360), *B. stearothermophilus* (JP 64/744992) or *B. pumilus* (WO 91/16422).

Other examples are lipase variants such as those described in WO 92/05249, WO 94/01541, EP 407 225, EP 260 105, WO 95/35381, WO 96/00292, WO 95/30744, WO 94/25578, WO 95/14783, WO 95/22615, WO 97/04079 and WO 97/07202, WO 00/60063.

Preferred commercially available lipase enzymes include Lipolase™ and Lipolase Ultra™, Lipex™, Lipoclean™ (Novozymes A/S).

The method of the invention may be carried out in the presence of phospholipase classified as EC 3.1.1.4 and/or EC 3.1.1.32. As used herein, the term phospholipase is an enzyme which has activity towards phospholipids. Phospholipids, such as lecithin or phosphatidylcholine, consist of glycerol esterified with two fatty acids in an outer (sn-1) and the middle (sn-2) positions and esterified with phosphoric acid in the third position; the phosphoric acid, in turn, may be esterified to an amino-alcohol. Phospholipases are enzymes which participate in the hydrolysis of phospholipids. Several types of phospholipase activity can be distinguished, including phospholipases $A_1$ and $A_2$ which hydrolyze one fatty acyl group (in the sn-1 and sn-2 position, respectively) to form lysophospholipid; and lysophospholipase (or phospholipase B) which can hydrolyze the remaining fatty acyl group in lysophospholipid. Phospholipase C and phospholipase D (phosphodiesterases) release diacyl glycerol or phosphatidic acid respectively.

The enzyme and the shading dye may show some interaction and should be chosen such that this interaction is not negative. Some negative interactions may be avoided by encapsulation of one or other of enzyme or shading dye and/or other segregation within the product.

Suitable proteases include those of animal, vegetable or microbial origin. Microbial origin is preferred. Chemically modified or protein engineered mutants are included. The protease may be a serine protease or a metallo protease, preferably an alkaline microbial protease or a trypsin-like protease. Preferred commercially available protease enzymes include Alcalase™, Savinase™, Primase™, Duralase™, Dyrazym™, Esperase™, Everlase™, Polarzyme™, and Kannase™, (Novozymes A/S), Maxatase™, Maxacal™, Maxapem™, Properase™, Purafect™, Purafect OxP™, FN2™, and FN3™ (Genencor International Inc.).

The method of the invention may be carried out in the presence of cutinase. classified in EC 3.1.1.74. The cutinase used according to the invention may be of any origin. Preferably cutinases are of microbial origin, in particular of bacterial, of fungal or of yeast origin.

Suitable amylases (alpha and/or beta) include those of bacterial or fungal origin. Chemically modified or protein engineered mutants are included. Amylases include, for example, alpha-amylases obtained from *Bacillus*, e.g. a special strain of *B. licheniformis*, described in more detail in GB 1,296,839, or the *Bacillus* sp. strains disclosed in WO 95/026397 or WO 00/060060. Commercially available amylases are Duramyl™, Termamyl™, Termamyl Ultra™, Natalase™, Stainzyme™, Fungamyl™ and BAN™ (Novozymes A/S), Rapidase™ and Purastar™ (from Genencor International Inc.).

Suitable cellulases include those of bacterial or fungal origin. Chemically modified or protein engineered mutants are included. Suitable cellulases include cellulases from the genera *Bacillus, Pseudomonas, Humicola, Fusarium, Thielavia, Acremonium*, e.g. the fungal cellulases produced from *Humicola insolens, Thielavia terrestris, Myceliophthora thermophila*, and *Fusarium oxysporum* disclosed in U.S. Pat. No. 4,435,307, U.S. Pat. No. 5,648,263, U.S. Pat. No. 5,691,178, U.S. Pat. No. 5,776,757, WO 89/09259, WO 96/029397, and WO 98/012307. Commercially available cellulases include Celluzyme™, Carezyme™, Endolase™, Renozyme™ (Novozymes A/S), Clazinase™ and Puradax HA™ (Genencor International Inc.), and KAC-500(B)™ (Kao Corporation).

Suitable peroxidases/oxidases include those of plant, bacterial or fungal origin. Chemically modified or protein engineered mutants are included. Examples of useful peroxidases include peroxidases from *Coprinus*, e.g. from *C. cinereus*, and variants thereof as those described in WO 93/24618, WO 95/10602, and WO 98/15257. Commercially available peroxidases include Guardzyme™ and Novozym™ 51004 (Novozymes A/S).

Enzyme Stabilizers

Any enzyme present in the composition may be stabilized using conventional stabilizing agents, e.g., a polyol such as propylene glycol or glycerol, a sugar or sugar alcohol, lactic acid, boric acid, or a boric acid derivative, e.g., an aromatic borate ester, or a phenyl boronic acid derivative such as 4-formylphenyl boronic acid, and the composition may be formulated as described in e.g. WO 92/19709 and WO 92/19708.

The indefinite article "a" or "an" and its corresponding definite article "the" as used herein means at least one, or one or more, unless specified otherwise.

Average molecular weights refer to weight average molecular weights.

EXPERIMENTAL

Example 1

1.1 g of an ethoxylated PEI (600 g/mol molecular weight PEI core with 15 ethoxylate groups per NH) was mixed with 0.1 g of reactive Blue 4 in an aqueous solution at pH=11. The number of $NH_2$ and NH groups was less than 5 mol %. The solution was heated for 6 hours at 65° C. The product was dialyzed against water (COMW=12000) for 72 hours and then freeze dried.

Example 2

The following formulations were created

| | % composition | | |
|---|---|---|---|
| | Composition 1 reference | Composition 2 reference | Composition 3 |
| 1,2-propanediol | 20 | 20 | 20 |
| Triethanolamine | 3.5 | 3.5 | 3.5 |
| C14-C15 alkyl 7-ethoxylate | 12.7 | 12.7 | 12.7 |
| Linear alkyl benzene sulfonate | 8.5 | 8.5 | 8.5 |
| C12-C18 fatty acid | 1.5 | 1.5 | 1.5 |
| Sodium C12-C14 alkyl ethoxy 3 sulfate | 4.2 | 4.2 | 4.2 |
| EPEI[1] | 0 | 3.3 | 0 |
| EPEI-RB4[2] | 0 | 0 | 3.3 |
| Perfume | 2.5 | 2.5 | 2.5 |
| NaOH to pH 6.5 | | | |
| water | balance | balance | balance |

[1]EPEI of example 1 without addition of a dye
[2]EPEI-RB4 of example 1 with Reactive Blue 4

The formulation were used to wash a mixture of white fabrics: woven cotton, knitted cotton, micro-fibre polyester, woven polycotton and knitted nylon-elastane at a Liquor to cloth ratio of 10:1 in a linitester. 26° French hard water was used and each wash lasted 30 minutes and was followed by a running rinse. The formulations were used at 1.3 g/L. To simulate soiling, soil strips were added to each wash cycle, the weight ratio of soil strips to the white fabrics was 7:1. The soil strips used were SBL 2004 Soil Ballast Fabrics (ex multimix soil ballast fabric (ex CFT Holland) in the weight ratio of 1:2.

After 5 washes the white clothes were removed, dried and the colour measured using a relflectometer and expressed as the CIE L*a*b* values. A Δb value was calculated:

$$\Delta b = b(\text{control without polymer}) - b(\text{wash with polymer})$$

A +ve value indicates a blueing of the fabric compared to the control. Bluer fabrics appear whiter to the eye.

The results are shown in the table below

| | Δb | |
|---|---|---|
| | Composition 2 reference | Composition 3 |
| Woven cotton | 0.4 | 0.8 |
| Knitted cotton | 0.1 | 0.6 |
| Polycotton | 0.3 | 0.6 |
| Polyester | 0.2 | 0.6 |
| Nylon-elastane | 0.3 | 1.2 |

The EPEI-RB4 increases the whiteness of the fabrics over the EPEI alone, as shown by the larger Δb values. The effect is seen on all fabrics.

We claim:

1. A dye polymer, the dye polymer comprising a core polyamine of which from 90 to 100 mol % of the primary and secondary amines of the core polyamine are alkoxylated and from 0.1 to 30 mol % of the primary and secondary amines of the core polyamine are covalently bound to a reactive dye, wherein the reactive dye is selected from a chromophore selected from the group consisting of: azo; anthraquinone; phthalocyanine; and, triphendioxazine;
wherein a molecular weight of the core polyamine is 500 to 1000;
wherein the core polyamine is a polyethylene-imine; and
wherein the primary and secondary amines of the core polyamine are alkoxylated with polyalkylene oxide chains having repeat units of alkoxy moieties in a range from 5 to 30.

2. A dye polymer according to claim 1, wherein the reactive dye is selected from the group consisting of: reactive blue; reactive black; reactive red; and, reactive violet dyes.

3. A dye polymer according to claim 1, wherein the reactive dye is selected from the group consisting of mixtures of: reactive black and reactive red; reactive blue and reactive red; reactive black and reactive violet; and, reactive blue and reactive violet, wherein the number of blue or black dye moieties is in excess of the red or violet dye moieties.

4. A dye polymer according to claim 1, wherein the reactive dye has reactive group selected from the group consisting of: dichlorotriazinyl; difluorochloropyrimidine; monofluorotrazinyl; dichloroquinoxaline; vinylsulfone; difluorotriazine; monochlorotriazinyl; bromoacrlyamide; and, trichloropyrimidine.

5. A dye polymer according to claim 1, wherein the reactive is dye blue bis-azo dye of the form

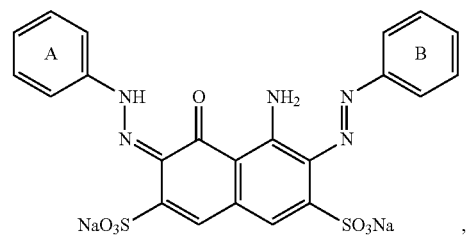

wherein one or both of the A and B rings are substituted by a reactive group.

6. A dye polymer according to claim 1, wherein the weight average molecular weight of the dye polymer is from 7000 to 70000.

7. A laundry treatment composition comprising:
(i) from 2 to 70 wt % of a surfactant; and,
(ii) from 0.0001 to 20.0 wt % of the dye polymer as defined in claim 1.

8. A domestic method of treating a textile, the method comprising the steps of:
(i) treating a textile with an aqueous solution of the dye polymer as defined in claim 1, the aqueous solution comprising from 10 ppb to 5000 ppm, of the dye polymer; and, from 0.0 g/L to 3 g/L of a surfactant; and,
(ii) optionally rinsing and drying the textile.

9. A domestic method of treating a textile according to claim 8, wherein the aqueous solution comprises a fluorescer in the range from 0.0001 g/l to 0.1 g/l.

* * * * *